US012809066B2

(12) United States Patent
Jin et al.

(10) Patent No.: US 12,809,066 B2
(45) Date of Patent: Nov. 24, 2026

(54) LENS MODULE

(71) Applicant: Samsung Electro-Mechanics Co., Ltd., Suwon-si (KR)

(72) Inventors: Sung Hoon Jin, Suwon-si (KR); Jin Se Kim, Suwon-si (KR); Byung Hyun Kim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 322 days.

(21) Appl. No.: 18/115,878

(22) Filed: Mar. 1, 2023

(65) Prior Publication Data

US 2024/0012183 A1 Jan. 11, 2024

(30) Foreign Application Priority Data

Jul. 6, 2022 (KR) ........................ 10-2022-0082954

(51) Int. Cl.
*G02B 7/02* (2021.01)
*G02B 5/00* (2006.01)
*G02B 27/00* (2006.01)

(52) U.S. Cl.
CPC ............. *G02B 5/003* (2013.01); *G02B 7/021* (2013.01); *G02B 27/0018* (2013.01)

(58) Field of Classification Search
CPC .... G02B 5/003; G02B 7/021; G02B 27/0018; G02B 7/02; G02B 3/00; G02B 3/0037; G03B 17/12
See application file for complete search history.

(56) References Cited

U.S. PATENT DOCUMENTS 8,985,789 B2 * 3/2015 Cho .................... G02B 27/0018 359/740
2004/0120046 A1 6/2004 Shirie
2009/0147381 A1 * 6/2009 Chen ...................... G02B 7/021 359/819
2012/0162795 A1 6/2012 Yoshimura
2014/0104691 A1 * 4/2014 Chang .................... G02B 7/021 359/611

(Continued)

FOREIGN PATENT DOCUMENTS

CN 101620307 A 1/2010
CN 102483504 A 5/2012

(Continued)

OTHER PUBLICATIONS

Taiwanese Office Action issued on Jan. 15, 2024, in counterpart Taiwanese Patent Application No. 112106365 (4 pages in English, 5 pages in Chinese).

(Continued)

*Primary Examiner* — Balram T Parbadia
(74) *Attorney, Agent, or Firm* — NSIP Law

(57) ABSTRACT

A lens module includes a first lens and a second sequentially disposed along an optical axis of the lens module; a first spacer disposed between the first lens and the second lens; and a second spacer disposed between the first lens and the first spacer, wherein a portion of a first surface of the first spacer facing in a direction of the optical axis is in contact with the first lens, and a remaining portion of the first surface is spaced apart from the first lens, and the second spacer is coupled to the remaining portion of the first surface.

17 Claims, 6 Drawing Sheets

(56) References Cited

U.S. PATENT DOCUMENTS

| | | | | |
|---|---|---|---|---|
| 2015/0234145 | A1* | 8/2015 | Chang | G02B 7/022 359/811 |
| 2015/0253569 | A1* | 9/2015 | Lin | G02B 5/003 359/503 |
| 2016/0161702 | A1* | 6/2016 | Yang | G02B 7/028 359/503 |
| 2020/0049927 | A1 | 2/2020 | Wei | |
| 2021/0063614 | A1 | 3/2021 | Gao | |
| 2021/0223499 | A1* | 7/2021 | Feng | G02B 5/223 |
| 2021/0302684 | A1 | 9/2021 | Yang et al. | |
| 2021/0389510 | A1 | 12/2021 | Xu et al. | |
| 2022/0128787 | A1* | 4/2022 | Liu | G02B 5/005 |
| 2022/0146777 | A1* | 5/2022 | Inaba | G02B 7/025 |
| 2023/0256693 | A1 | 8/2023 | Ham et al. | |
| 2023/0314911 | A1* | 10/2023 | Lim | G02B 7/028 |

FOREIGN PATENT DOCUMENTS

| | | | |
|---|---|---|---|
| CN | 204855917 | U | 12/2015 |
| CN | 216411693 | U | 4/2022 |
| EP | 2 357 503 | B1 | 10/2018 |
| JP | 2004-184687 | A | 7/2004 |
| JP | 6619118 | B1 | 12/2019 |
| JP | 6882840 | B2 | 6/2021 |
| KR | 10-2017-0051407 | A | 5/2017 |
| KR | 10-2021-0119863 | A | 10/2021 |
| KR | 10-2022-0037877 | A | 3/2022 |
| TW | 200949332 | A | 12/2009 |
| TW | I416190 | B | 11/2013 |
| TW | 202212115 | A | 4/2022 |

OTHER PUBLICATIONS

Korean Office Action issued on Sep. 20, 2024, in counterpart Korean Patent Application No. 10-2022-0082954 (9 pages in English, 7 pages in Korean).

Korean Office Action issued on Oct. 30, 2025, in counterpart Korean Patent Application No. 10-2022-0082954 (10 pages in English, 7 pages in Korean).

Taiwanese Office Action issued on Jun. 4, 2026, in counterpart Taiwanese Patent Application No. 114117985 (11 pages in English, 8 pages in Chinese).

* cited by examiner

LENS MODULE

CROSS-REFERENCE TO RELATED APPLICATIONS

This application claims the benefit under 35 USC 119(a) of Korean Patent Application No. 10-2022-0082954 filed on Jul. 6, 2022, in the Korean Intellectual Property Office, the entire disclosure of which is incorporated herein by reference for all purposes.

BACKGROUND

1. Field

This application relates to a lens module.

2. Description of Related Art

An imaging apparatus may include a lens barrel including a plurality of lenses in order to image a subject. Recently, there has been a trend to increase the number of lenses accommodated in the lens barrel in order to improve an image quality of the imaging apparatus. Accordingly, precise assembly of lenses has become important.

During a process of assembling lenses, a spacer may be disposed between the lenses. The spacer serves to maintain a gap between the plurality of lenses and prevent a flare phenomenon due to extraneous light. It may be difficult to process a seating surface of a lens contacting the spacer to have a planar surface. When the seating surface of the lens has a curvature, or has an inclination other than perpendicular to an optical axis, a line contact between the lens and the spacer may occur, thereby causing an assembly stability of a lens module to deteriorate.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a lens module includes a first lens and a second lens sequentially disposed along an optical axis of the lens module; a first spacer disposed between the first lens and the second lens; and a second spacer disposed between the first lens and the first spacer, wherein a portion of a first surface of the first spacer facing in a direction of the optical axis is in contact with the first lens, and a remaining portion of the first surface is spaced apart from the first lens, and the second spacer is coupled to the remaining portion of the first surface.

There may be a step in the first surface of the first spacer in the direction of the optical axis.

The second spacer may be disposed on the step.

The second spacer may extend further toward the optical axis than the first spacer.

A thickness of the second spacer in the direction of the optical axis may be less than a thickness of the first spacer in the direction of the optical axis.

A thickness of the second spacer in the direction of the optical axis may be 0.1 mm or less.

The portion of the first surface of the first spacer may be in surface contact with the first lens.

The first surface of the first spacer may include a plurality of protrusions spaced apart from each other, and the plurality of protrusions may be in contact with the first lens.

An inner side surface of the second spacer facing the optical axis may have an undulating shape repeatedly extending toward and away from the optical axis.

In another general aspect, a lens module includes a lens barrel; a plurality of lenses sequentially disposed in the lens barrel along an optical axis of the lens module; a first spacer disposed between adjacent lenses among the plurality of lenses, and having a hole formed therein to enable incident light to pass through the plurality of lenses; and a second spacer seated and installed on the first spacer, wherein there is a gap between the second spacer and a surface of one lens of the adjacent lenses contacting the first spacer.

A seating surface of the first spacer on which the second spacer is seated and installed may be farther away from the one lens than the surface of the one lens contacting the first spacer.

The first spacer and the second spacer may be made of different materials.

A seating surface of the first lens on which the second spacer is seated and installed is below a surface of the first spacer contacting the surface of the one lens.

The one lens may be a first lens having an inclined surface or a curved surface, and the inclined surface or the curved surface of the first lens and the first spacer may be in surface contact with each other.

The one lens may be a first lens having an inclined surface or a curved surface, the first spacer may include a plurality of protrusions spaced apart from each other, and the inclined surface or the curved surface of the first lens and the plurality of protrusions may be in contact with each other.

The first lens may include a plurality of grooves accommodating the plurality of protrusions.

In another general aspect, a lens module includes a first lens and a second lens sequentially disposed along an optical axis of the lens module; a first spacer disposed between the first lens and the second lens along the optical axis; and a second spacer disposed on the first spacer, wherein the first spacer includes a first surface facing toward the first lens and contacting a surface of the first lens; and a second surface recessed from the first surface of the first spacer in a direction of the optical axis away from the first lens, and the second spacer is disposed on the second surface of the first spacer.

The first spacer may further include a third surface substantially parallel to the optical axis and connecting the first surface of the spacer to the second surface of the spacer.

The surface of the first lens contacting the first surface of the first spacer may be a non-planar surface, and the first surface of the first spacer may be a non-planar first surface substantially matching the non-planar surface of the first lens so that the non-planar surface of the first lens and the non-planar first surface of the first spacer are substantially in surface contact with each other.

The second spacer may have an undulating inner surface facing the optical axis.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
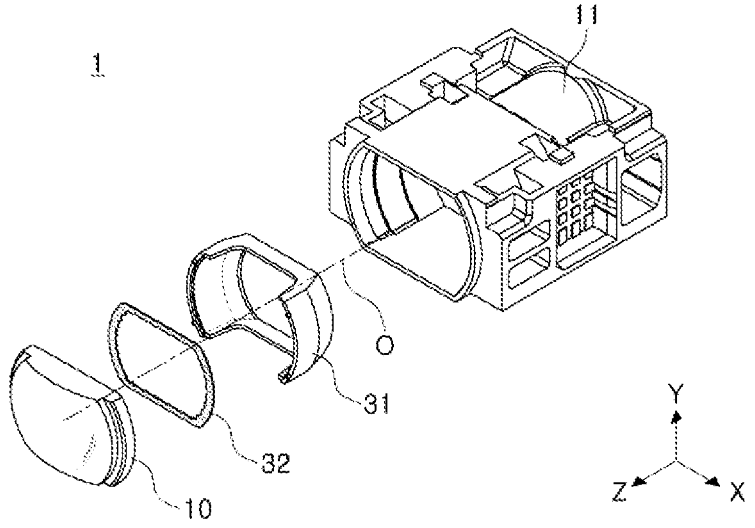
FIG. 1 is an exploded perspective view of a lens module according to an embodiment of the present disclosure.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated by 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Figure 2:
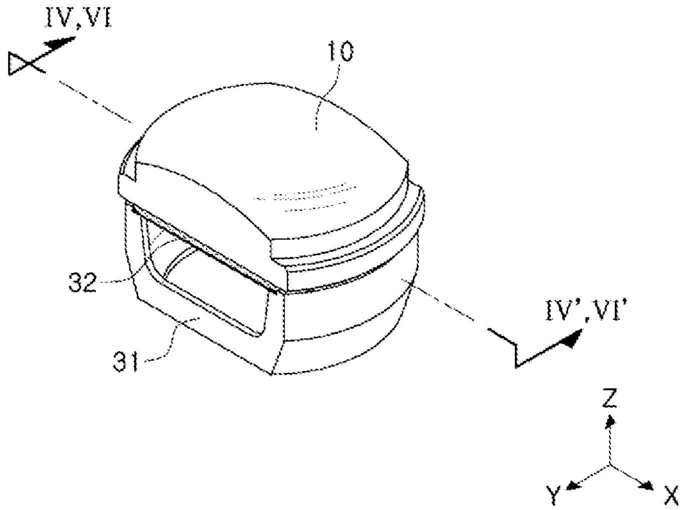
FIG. 2 is a perspective view illustrating a state in which a first lens, a first spacer, and a second spacer of FIG. 1 are assembled.

FIG. 1 is an exploded perspective view of a lens module according to an embodiment of the present disclosure, and FIG. 2 is a perspective view illustrating a state in which a first lens, a first spacer, and a second spacer of FIG. 1 are assembled.

Referring to FIGS. 1 and 2, a lens module 1 according to an embodiment of the present disclosure may include a plurality of lenses, a lens barrel 11 accommodating the plurality of lenses, and spacers 31 and 32. The plurality of lenses may include a first lens 10 located closest to a subject, and a second lens (not shown) adjacent to the first lens 10.

According to an embodiment, spacers 31 and 32 may be disposed between adjacent lenses. For example, the spacers 31 and 32 may be disposed between the first lens 10 and the second lens (not shown). Spacers 31 and 32 according to an embodiment of the present disclosure may include a first spacer 31 and a second spacer 32. The first spacer 31 and the second spacer 32 may have a shape perforated to allow light to pass in a direction of an optical axis O.

The first spacer 31 may maintain a gap between two adjacent lenses in a direction of the optical axis O. For example, the first spacer 31 may be disposed between the first lens 10 and the second lens (not shown) so that a length of the first spacer 31 in a direction of the optical axis O may be equal to a gap between the first lens 10 and the second lens (not shown).

The second spacer 32 may serve to prevent unnecessary light from passing through the lens module 1. For example, the second spacer 32 may serve as a light blocking member to reduce a flare phenomenon. The second spacer 32 may be disposed between the first lens and the first spacer 31. For example, the second spacer 32 may be formed as a thin ring of an opaque material. In addition, an inner side surface of the second spacer 32 facing the optical axis O may have an undulating shape repeatedly extending toward and away from the optical axis O to reduce a flare phenomenon as shown, for example, in FIG. 10. For example, the inner side surface of the second spacer 32 may be formed to have a wave pattern.

The first spacer 31 and the second spacer 32 may be formed to have different thicknesses in a direction of the optical axis O. According to an embodiment of the present disclosure, a thickness of the first spacer 31 may be thicker than a thickness of the second spacer 32 in a direction of the optical axis O. As described above, the second spacer 32 may have a very reduced thickness in a direction of the optical axis O because of its main role as a light blocking member. For example, the thickness of the second spacer 32 in the direction of the optical axis O may be 0.01 mm or more and 0.1 mm or less.

The first spacer 31 and the second spacer 32 may be made of different materials, or may be made of the same material. For example, the first spacer 31 may be made of a plastic or metal material, and the second spacer 32 may be made of a metal material.

Figure 3:
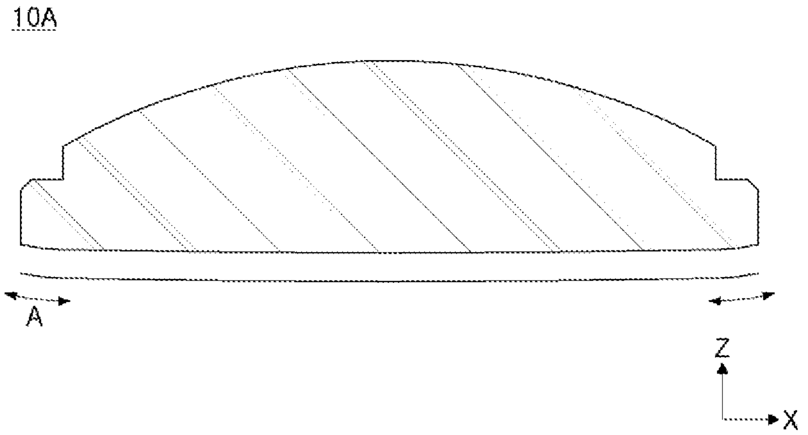
FIG. 3 is a side view of a lens having a surface with a curvature.
Figure 4:
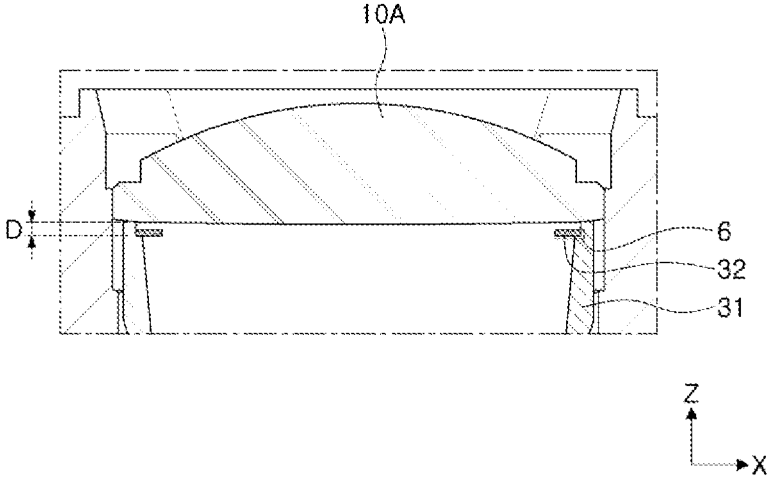
FIG. 4 is a partial cross-sectional view of a lens module according to an embodiment of the present disclosure including the lens of FIG. 3 taken in a direction perpendicular to the Y-axis along the line IV-IV' in FIG. 2.
Figure 5:
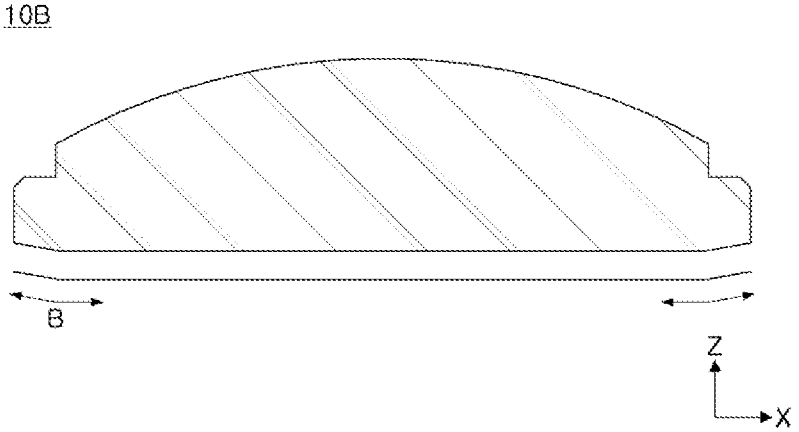
FIG. 5 is a side view of a lens having a surface with an inclination.
Figure 6:
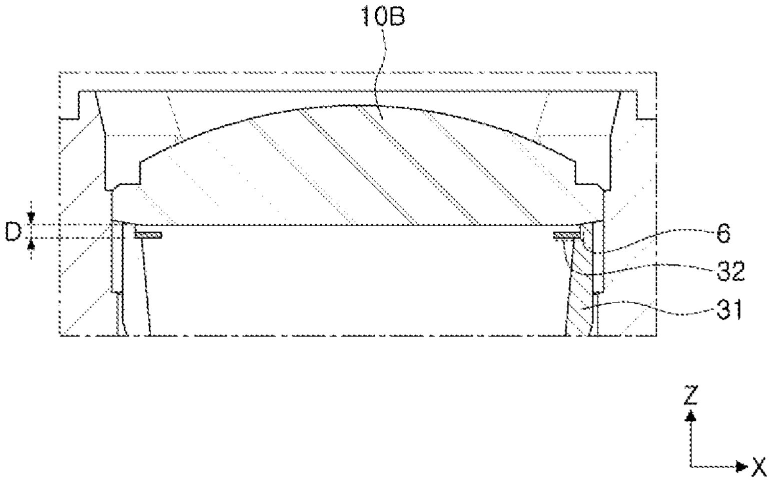
FIG. 6 is a partial cross-sectional view of a lens module according to another embodiment of the present disclosure including the lens of FIG. 5 taken in a direction perpendicular to the Y-axis along the line VI-VI' in FIG. 2.

FIG. 3 is a side view of a lens having a surface with a curvature, and FIG. 4 is a partial cross-sectional view of a lens module according to an embodiment of the present disclosure including the lens of FIG. 3 taken in a direction perpendicular to the Y-axis along the line IV-IV' in FIG. 2. FIG. 5 is a side view of a lens having a surface with an inclination, and FIG. 6 is a partial cross-sectional view of a lens module according to another embodiment of the present disclosure including the lens of FIG. 5 taken in a direction perpendicular to the Y-axis along the line VI-VI' in FIG. 2.

Referring to FIGS. 3 and 5, a surface of a first lens 10 contacting a first spacer 31 may be formed to have a non-planar shape. FIG. 3 illustrates a first lens 10A having a rib surface with a curvature A, and FIG. 5 illustrates a first lens 10B having a rib surface with an inclination B. For example, the surface with the inclination B of the first lens 10B may form an obtuse angle or an acute angle with respect to an optical axis.

In a process of manufacturing a lens module, it may be easier to process a rib surface of a lens contacting a spacer to have a curvature or an inclination compared to processing the rib surface to have a planar shape. In addition, even when the rib surface of the lens is processed to have a planar surface, the planar surface may not be physically perfect.

In a lens having a non-planar rib surface, a tilt phenomenon or an assembly failure may occur due to a line contact with the spacer. That is, because the rib surface is non-planar, an entire surface of the non-planar rib surface cannot contact the spacer. Rather, the non-planar rib surface may only contact the spacer along a line.

Therefore, a first spacer 31 according to an embodiment of the present disclosure may be in surface contact with a non-planar rib surface of a lens to prevent deterioration of an image quality, and a second spacer 32 may not be in contact with the lens. Hereinafter, an arrangement of the first spacer 31 and the second spacer 32 according to an embodiment of the present disclosure will be described.

FIGS. 3 and 4 illustrate a state in which a lens 10A having a surface with a curvature A, a first spacer 31, and a second spacer 32 are assembled. Referring to FIGS. 3 and 4, when a surface of the first spacer 31 facing in a direction of an optical axis is referred to as a first surface, a portion of the first surface may be in contact with the first lens 10A, and a remaining portion of the first surface may be spaced apart from the first lens 10A. For example, as illustrated in FIG. 4, the remaining portion of the first surface may be spaced apart from the first lens 10A by a distance D in the direction of the optical axis. In this case, a step 6 may be formed in the first surface of the first spacer 31 in a direction of the optical axis O. For example, the step 6 may be formed by a difference in height between the portion of the first surface contacting the first lens 10A and the remaining portion of the first surface spaced apart from the first lens 10A in the direction of the optical axis O. Although the first lens of the above-described embodiment has been described with reference to the first lens 10A illustrated in FIG. 3, the first lens of the above-described embodiment may be also applied to the first lens 10B having a surface with an inclination B illustrated in FIG. 5.

The portion of the first surface of the first spacer 31 contacting the first lens 10A may be in surface contact with the first lens 10A. For example, the portion of the first surface may be formed as a curved surface capable of making surface contact with the curved surface A of the first lens 10A.

The second spacer 32 may be disposed on the step 6 formed in the first spacer 31. The second spacer 32 may be formed to protrude further toward the optical axis O compared to the first spacer 31. For example, an inner side surface of the second spacer 32 may be disposed closer to the optical axis O compared to an inner side surface of the first spacer 31. For example, when viewed in a direction of the optical axis O, a width of an area of the second spacer 32 through which light passes may be smaller than a width of an area of the first spacer 31 through which the light passes.

FIGS. 5 and 6 illustrate a state in which a first lens 10B with a surface having an inclination B, a first spacer 31, and a second spacer 32 are assembled. Referring to FIGS. 5 and 6, a portion of a first surface of the first spacer 31 contacting the first lens 10B may be in surface contact with the first lens 10B. For example, the portion of the first surface may include an inclination capable of making surface contact with the inclination B of the first lens 10B.

Figure 7:
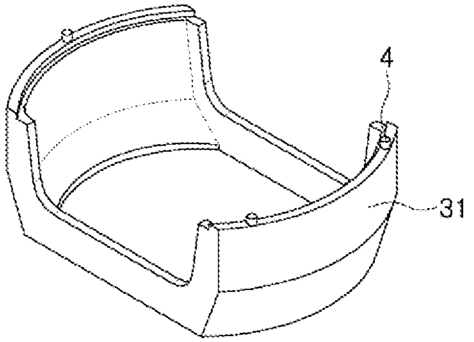
FIG. 7 is a plan perspective view of a first spacer according to an embodiment of the present disclosure in which a plurality of protrusions are formed.
Figure 7:
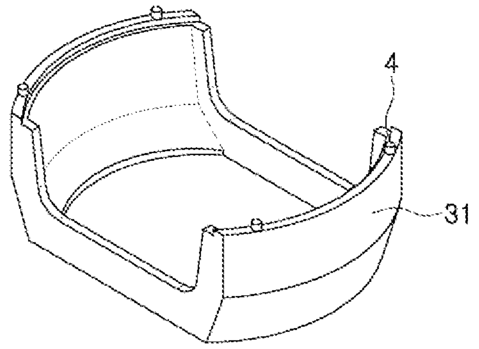
Figure 8:
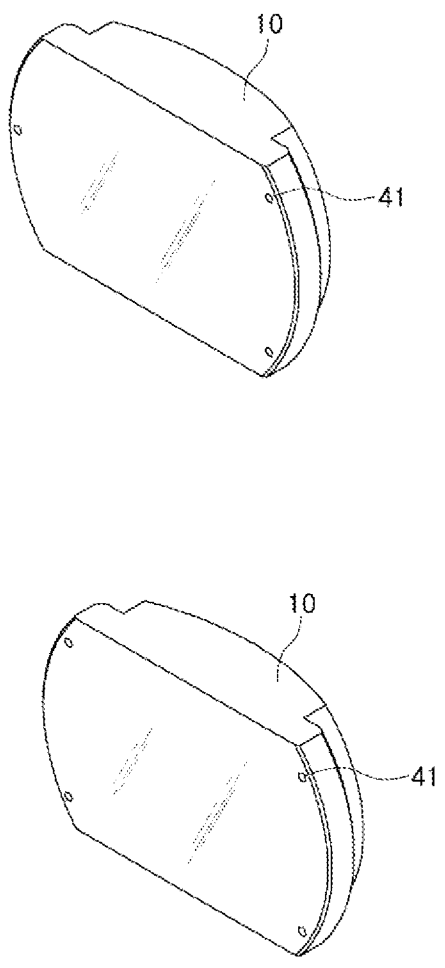
FIG. 8 is a bottom perspective view of a first lens according to an embodiment of the present disclosure in which a plurality of accommodating grooves are formed.

FIG. 7 is a plan perspective view of a first spacer according to an embodiment of the present disclosure on which a plurality of protrusions are formed, and FIG. 8 is a bottom perspective view of a first lens according to an embodiment of the present disclosure in which a plurality of accommodating grooves are formed.

Referring to FIG. 7, a plurality of protrusions 4 may be formed on a portion of a first surface of a first spacer 31. The plurality of protrusions 4 may be spaced apart from each other. For example, when three protrusions 4 are formed on the portion of the first surface, one protrusion 4 may be disposed on one side of the first spacer 31 and two protrusions 4 may be disposed on the other side of the first spacer 31. As another example, when four protrusions 4 are formed on the portion of the first surface, two protrusions 4 may be disposed on one side of the first spacer 31 and two protrusions 4 may be formed on the other side of the first spacer 31.

Referring to FIG. 8, a plurality of accommodating grooves 41 may be formed in a rib surface of a first lens 10 to accommodate the plurality of protrusions 4 in FIG. 7. For example, when three protrusions 4 are formed, three accommodating grooves 41 may be formed in the rib surface of the first lens 10. As another example, when four protrusions 4 are formed, four accommodating grooves 41 may be formed in the rib surface. According to an embodiment of the present disclosure, a plurality of protrusions 4 and a plurality of accommodating grooves 41 may be formed to increase an assembly stability of the first lens 10 and the first spacer 31.

Figure 9:
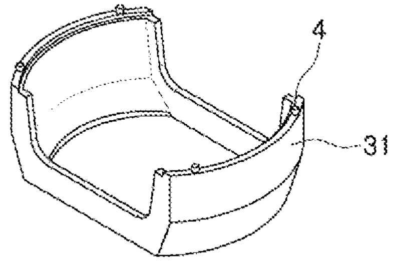
FIGS. 9, 10, and 11 are views sequentially illustrating a process of assembling a first spacer, a second spacer, and a first lens according to an embodiment of the present disclosure.
Figure 10:
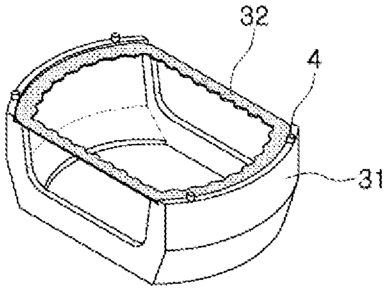
Figure 11:
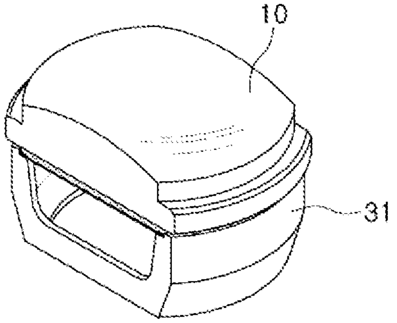

FIGS. 9, 10, and 11 are views sequentially illustrating a process of assembling a first spacer, a second spacer, and a first lens according to an embodiment of the present disclosure.

Referring to FIG. 9, a first spacer 31 serving to maintain a gap between lenses may be provided. A step on which a second spacer 32 may be disposed may be formed in the first spacer 31. Referring to FIG. 10, the second spacer 32 may be disposed on the step of the first spacer 31. The second spacer 32 may be formed to have a very reduced thickness, and may be accommodated in the first spacer 31. For example, a portion in which the second spacer 32 and the first spacer 31 are in contact with each other may be disposed below a portion in which the first spacer 31 and a first lens 10 are in contact with each other. Referring to FIG. 11, the first lens 10 may be seated on a seating surface of the first spacer 31. In this case, a portion of a first surface of the first spacer 31 and a portion of the first lens 10 may be in surface contact with each other, and a plurality of protrusions 4 formed on the first spacer 31 may be accommodated in a plurality of accommodating grooves 41 formed in the first lens 10.

Figure 12:
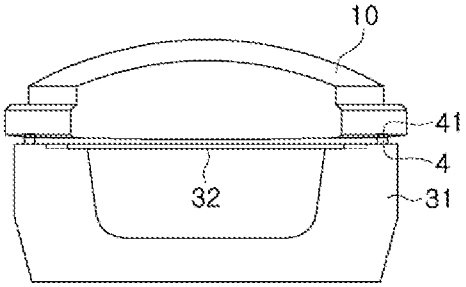
FIG. 12 is a side view of another example of an assembly including the first spacer, the second spacer, and the first lens of FIGS. 9, 10, and 11.

FIG. 12 is a side view of another example of an assembly including the first spacer, the second spacer, and the first lens of FIGS. 9, 10, and 11.

Referring to FIG. 12, in the assembly of FIG. 11, a portion of a first surface of the first spacer 31 and a portion of the first lens 10 may be in surface contact with each other when the plurality of protrusions 4 formed on the first spacer 31 are accommodated in plurality of accommodating grooves 41 formed in the first lens 10. In contrast, in the assembly of FIG. 12, the plurality of protrusions 4 formed on the first spacer 31 may be longer than the plurality of accommodating grooves 41 formed in the first lens 10 so that the first lens 10 may be spaced apart from the first spacer 31 when the plurality of protrusions 4 formed on the first spacer 31 are accommodated in the plurality of accommodating grooves 41 formed in the first lens 10.

According to the embodiments of the present disclosure described above, a stability of a lens module may be enhanced to improve an image quality of the lens module.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and are not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A lens module comprising:

a first lens and a second lens sequentially disposed along an optical axis of the lens module so that the first lens is disposed closest to an object side of the lens module in a direction of the optical axis among the first lens and the second lens;

a first spacer disposed between the first lens and the second lens; and a second spacer disposed on the first spacer and spaced apart from the first lens and the second lens in the direction of the optical axis, wherein a portion of the second spacer disposed on the first spacer is disposed closer to the first lens than to the second lens in the direction of the optical axis, a portion of a first surface of the first spacer facing toward the object side of the lens module in the direction of the optical axis is a non-planar surface on which the first lens is seated, and a remaining portion of the first surface facing toward the object side of the lens module in the direction of the optical axis is a planar surface on which the second spacer is seated, a surface of the first lens contacting the non-planar surface of the first surface of the first spacer is a non-planar surface substantially matching the non-planar surface of the first surface of the first spacer, and an entirety of the non-planar surface of the first surface of the first spacer is a curved surface having no inflection point, or an inclined surface having no inflection point and inclined relative to a plane perpendicular to the optical axis.

2. The lens module of claim 1, wherein there is a step in the first surface of the first spacer in the direction of the optical axis.

3. The lens module of claim 2, wherein the second spacer is disposed on the step.

4. The lens module of claim 3, wherein the second spacer extends further toward the optical axis than the first spacer.

5. The lens module of claim 1, wherein a thickness of the second spacer in the direction of the optical axis is less than a thickness of the first spacer in the direction of the optical axis.

6. The lens module of claim 5, wherein the thickness of the second spacer in the direction of the optical axis is 0.1 mm or less.

7. The lens module of claim 1, wherein the non-planar surface of the first surface of the first spacer is in surface contact with the non-planar surface of the first lens.

8. The lens module of claim 1, wherein an inner side surface of the second spacer facing the optical axis has an undulating shape repeatedly extending toward and away from the optical axis.

9. A lens module comprising:

a lens barrel;

a plurality of lenses sequentially disposed in the lens barrel along an optical axis of the lens module;

a first spacer disposed between two adjacent lenses among the plurality of lenses and having a hole formed therein to enable incident light to pass through the plurality of lenses; and a second spacer disposed on the first spacer and spaced apart from the two adjacent lenses in a direction of the optical axis, wherein one lens disposed closest to an object side of the lens module in the direction of the optical axis among the two adjacent lenses is seated on the first spacer, a first seating surface of the first spacer facing toward the object side of the lens module and contacting a surface of the one lens is a non-planar surface, and a second seating surface of the first spacer facing toward the object side of the lens module on which the second spacer is seated is a planar surface, the surface of the one lens contacting the first seating surface of the first spacer is a non-planar surface substantially matching the non-planar surface of the first seating surface of the first spacer, an entirety of the non-planar surface of the first seating surface of the first spacer is a curved surface having no inflection point, or an inclined surface having no inflection point and inclined relative to a plane perpendicular to the optical axis, and there is a gap between the second spacer and the one lens contacting the non-planar surface of the first seating surface of the first spacer.

10. The lens module of claim 9, wherein the second seating surface of the first spacer on which the second spacer is seated is farther away from the one lens than the non-planar surface of the first seating surface of the first spacer on which the one lens is seated.

11. The lens module of claim 9, wherein the first spacer and the second spacer are made of different materials.

12. The lens module of claim 9, wherein the second seating surface of the first spacer on which the second spacer is seated is recessed from the non-planar surface of the first seating surface of the first spacer contacting the non-planar surface of the one lens in the direction of the optical axis away from the one lens.

13. The lens module of claim 9, wherein the non-planar surface of the one lens and the non-planar surface of the first seating surface of the first spacer are in surface contact with each other.

14. A lens module comprising:

a first lens and a second lens sequentially disposed along an optical axis of the lens module so that the first lens is disposed closest to an object side of the lens module in a direction of the optical axis among the first lens and the second lens;

a first spacer disposed between the first lens and the second lens along the optical axis; and a second spacer disposed on the first spacer, wherein a portion of the second spacer disposed on the first spacer is disposed closer to the first lens than to the second lens in the direction of the optical axis, the first spacer comprises:

a first surface facing toward the first lens and contacting a surface of the first lens; and a second surface recessed from the first surface of the first spacer in the direction of the optical axis away from the first lens and contacting a surface of the second spacer, the first surface of the first spacer is a non-planar surface, and the surface of the first lens contacting the non-planar first surface of the first spacer is a non-planar surface substantially matching the non-planar first surface of the first space, the second surface of the first spacer is a planar surface, and the surface of the second spacer contacting the second surface of the first spacer is a planar surface, and an entirety of the non-planar first surface of the first spacer is a curved surface having no inflection point, or an inclined surface having no inflection point and inclined relative to a plane perpendicular to the optical axis.

15. The lens module of claim 14, wherein the first spacer further comprises a third surface substantially parallel to the optical axis and connecting the first surface of the spacer to the second surface of the spacer.

16. The lens module of claim 14, wherein the non-planar surface of the first lens contacting the non-planar first surface of the first spacer and the non-planar first surface of the first spacer are in surface contact with each other.

17. The lens module of claim 14, wherein the second spacer has an undulating inner surface facing the optical axis.

* * * * *